March 7, 1933.  W. L. MARLING  1,900,186
LAWN MOWER SHARPENER
Filed March 9, 1931
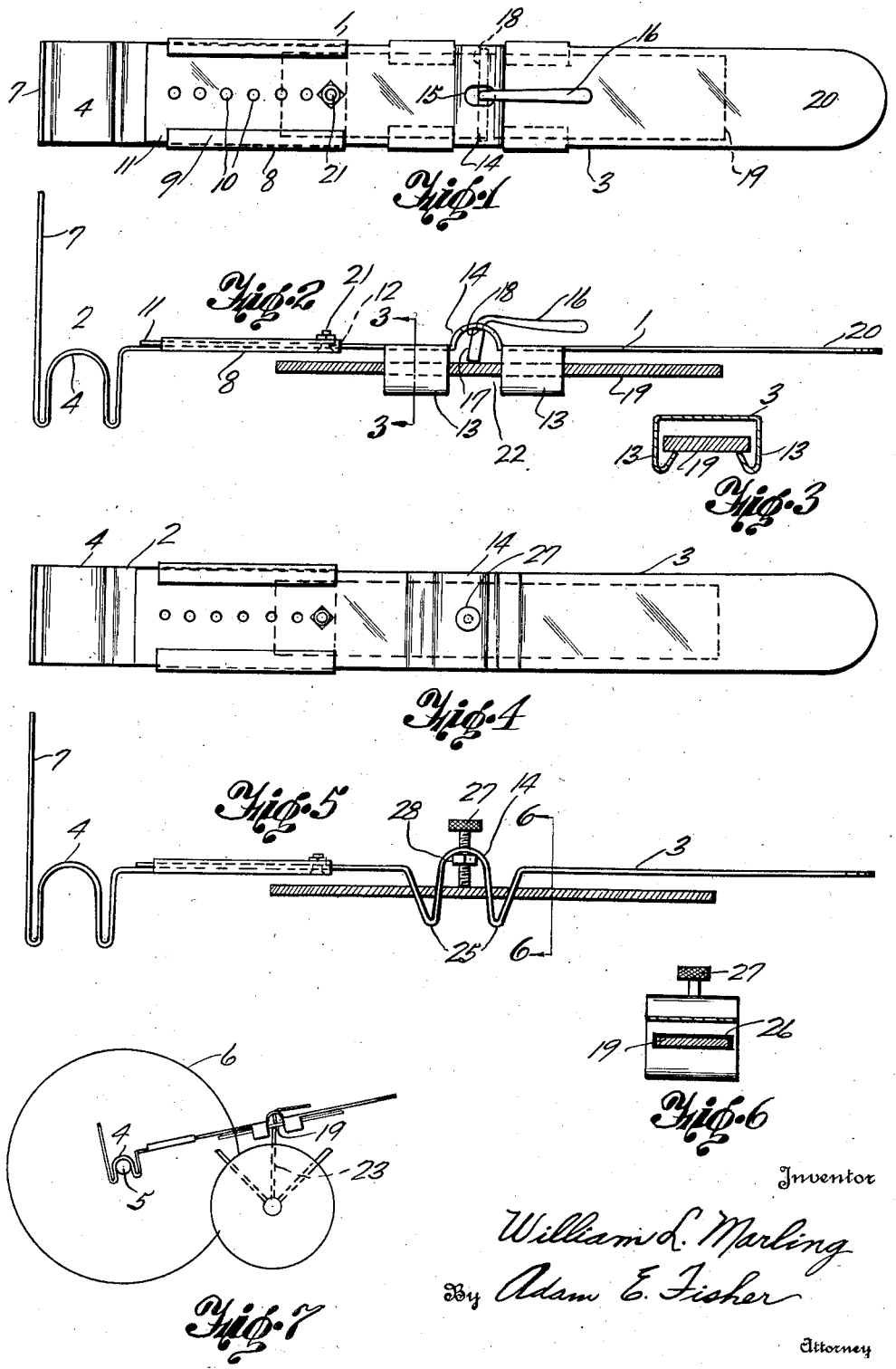

Patented Mar. 7, 1933

1,900,186

UNITED STATES PATENT OFFICE

WILLIAM L. MARLING, OF WEIMAR, CALIFORNIA

LAWN MOWER SHARPENER

Application filed March 9, 1931. Serial No. 521,189.

This invention is a lawn mower sharpener. An object of the invention is to provide in a relatively simple and compact form a sharpener adapted for ready use in sharpening the curved blades of a conventional lawn mower having a rotatable form of blade assembly.

Another object is to provide a lawn mower sharpener ready for instant use without dismounting the cutting blades of the mower.

Another object is to provide a blade sharpener of the kind described, the same being in the nature of a file holder adapted for holding an ordinary file, and including means for holding and adjusting the file properly upon the cutting edge of the blade and maintaining it at the proper angle thereto while it is being drawn over the edge for the purpose of sharpening same.

With these and such other objects and advantages as may appear, attention is called to the following specification and to the accompanying drawing as constituting part thereof and wherein Figure 1 is a top plan view of the file holder or blade sharpener, and file being shown mounted therein;

Figure 2 is an edge view of the assembly shown in Figure 1;

Figure 3 is a section on the line 3—3 of Figure 2;

Figure 4 is a top plan view of a modified form of sharpener or file holder, a file being shown in dotted lines as mounted therein;

Figure 5 is an edge view of the assembly of Figure 4;

Figure 6 is a section on the line 6—6 of Figure 5;

Figure 7 is a side view of a lawn mower of a conventional rotary form, showing my sharpener mounted thereupon as for the purpose of sharpening one of the blades.

As shown in Figures 1, 2 and 3, the invention comprises a two-piece assembly 1 preferably made of relatively thin strip metal and including an axle or shaft rest 2 and a file holding clip 3. The axle rest or guide 2 is bent to form an axle or shaft engaging stirrup 4 adapted to seat upon the axle 5 of the lawn mower 6, or any other shaft or cross bar suitable to serve as a support, a divergently turned handle 7 and a file clip holder 8 extended perpendicularly relative to the handle 7. The lateral margins of the clip holder 8 are turned over and inwardly to form a slide-way 9 which is pierced intermediately by a row of adjustment holes 10. The file holding clip 3 includes a shank 11 adapted to slidably engage the slideway 9 of the part 2, wherein it may be adjustably locked by means of a small stove bolt 21 or the like passed through a hole 12 in the shank and into any one of the series of adjustment holes 10 of the part 2. Marginal portions of the clip 3 are turned over and inwardly to form pairs of slideways 13 longitudinally spaced apart to provide an open file way 22. Intermediately of these slideways the metal is formed up transversely to form an offset or raised lock seat 14, the same being slotted at 15. Through this slot extends the handle 16 of a cam lever 17 which extends transversely of the axis of the file clip 3 and the shoulders 18 of which have a bearing at the under side of the seat 14. This cam 17 is adapted to bear upon a file 19 inserted longitudinally through the slideways 13, thus locking the file firmly in position as the handle 16 is pressed down. A handle 20 is formed at the end of this file clip.

In the use of the tool as described, the stirrup 4 is positioned upon the axle 5, or other suitable bearing, the file 19 is locked within the slideways 13 as stated, and the clip 3 is then adjusted relative to the axle rest 4 by means of the bolt 21 and the adjustment holes 10, so that the exposed portion of the file at the open file-way 22, between the slideways 13 will have the proper bearing, and at the proper angle, upon one of the mower blades 23 which is properly upturned for the purpose, as shown in Figure 7.

The operator, by taking hold of the two handles 7 and 20, may now move or draw the tool, including of course the file, evenly along and over the blade 23, from end to end thereof, and by properly regulating the pressure and movements of the device and rendering to each blade approximately the same number of strokes, all the blades may be uniformly and evenly sharpened.

A few differences from the structures just described, are shown in the Figures 4, 5 and 6. Here instead of the inturned slideways 13, spaced loops 25 of metal are extended from the file clip 3, at either side of the seat 14, and then aligned file slots 26 are formed through these slots, the same being adapted to receive the said file 19. Instead of the cam lever 17, of the other design, there is here shown a thumb screw 27 with lock nut 28, the said screw passing through the seat 14 and having threaded engagement therewith as shown. The use and operation of this modified form of tool is identical with that first described. This thumb screw locks the file 19 firmly in place in the clip, similarly of the locking action of the cam 17 of the other structure.

It will be noted that the file 19 is inserted in the holder with the axis of the file extended parallel with the axis of the holder. Thus in use, the edge of the mower blade contacts with the file transversely of the latter, so that as one portion of the file becomes worn, the file may be readily shifted by the simple manipulation of the cam 17 or screw 27 so as to bring a fresh part of the file to bear upon the edge of the blade.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a tool holder of the kind described, a two piece assembly including a shaft rest and a file holding clip, the same being of relatively thin strip material and associated together and arranged for adjustment upon their longitudinal axes, the said shaft rest including a shaft engaging stirrup and a handle, and the said file holding clip including a handle at its outer end aligned with the handle of the shaft rest, a portion of the said clip inwardly of the handle portion thereof being raised to form a slotted cam seat, a lock cam operatively mounted within the said cam seat, and a handle extended from the lock cam out through the slot thereof, the said handle being arranged to lie flat to the file holding clip when in its locking position, whereby it may be readily held down to its locking position by the operator in the act of grasping the handle portion of the file holding clip.

In testimony whereof I affix my signature.

WILLIAM L. MARLING.